United States Patent [19]

Stacher et al.

[11] Patent Number: 5,253,796
[45] Date of Patent: Oct. 19, 1993

[54] RETORT FOR GAS DIFFUSION BONDING OF METALS UNDER VACUUM

[75] Inventors: George W. Stacher, Westminster; Seb R. Sarkisian, Torrance, both of Calif.

[73] Assignee: Rockwell International Corporation, Seal Beach, Calif.

[21] Appl. No.: 724,250

[22] Filed: Jul. 1, 1991

[51] Int. Cl.⁵ ............................................. B23K 20/00
[52] U.S. Cl. ................................. 228/193; 228/190; 228/235.1
[58] Field of Search ............... 228/118, 157, 193, 190, 228/243

[56] References Cited

U.S. PATENT DOCUMENTS

| | | | |
|---|---|---|---|
| 3,015,885 | 1/1962 | McEuen | 228/118 |
| 3,186,083 | 6/1965 | Wright | 228/118 |
| 3,345,735 | 10/1967 | Nicholls | 228/118 |
| 4,087,037 | 5/1978 | Schier | 228/157 |
| 4,526,312 | 7/1985 | Goss | 228/157 |
| 4,916,027 | 4/1990 | DelMundo | 228/118 |
| 5,024,368 | 6/1991 | Bottomley | 228/193 |

Primary Examiner—Mark Rosenbaum
Assistant Examiner—James Miner
Attorney, Agent, or Firm—Terrell P. Lewis; Charles T. Silberberg

[57] ABSTRACT

A retort for use in diffusion bonding preselected areas of a stack of metallic sheets during a process of fabricating metallic sandwich structures. The retort facilitates a contamination-free, evacuated environment in which a plurality of sheets of titanium aluminide can be joined to one another at selected areas to form a pack. The process of joining embraces a technique of elevated temperature gas diffusion bonding. Subsequent superplastic expansion of the bonded blanks is employed to form desired sandwich structures.

9 Claims, 2 Drawing Sheets

RETORT FOR GAS DIFFUSION BONDING OF METALS UNDER VACUUM

BACKGROUND OF THE INVENTION

1. Field of the Invention

The present invention relates to the fabrication of structural units from titanium aluminide materials, and more particularly to a process and an apparatus for selectively joining titanium aluminide sheets to form a metallic structure which can then be superplastically expanded to form a sandwich structure of a desired shape.

2. Discussion of the Known Prior Art

Titanium aluminide materials are well known in the metallurgical arts as materials which exhibit excellent high-temperature strength and oxidation and creep resistance.

Titanium aluminides, like other titanium alloys, are metals which are relatively brittle and difficult to process and/or fabricate at or near room temperatures. One fabrication technique which has found widespread utility in the fashioning of structures for various industries is diffusion bonding.

Diffusion bonding refers to the metallurgical joining of surfaces of similar or dissimilar metals by applying heat and pressure for a time duration so as to cause co-mingling of atoms at the joint interface.

The application of pressure accomplishes a plastic flow of the material to fill normal void areas. If the pressure is too low, small voids will remain at the joint interface and the joint strength will be less than the maximum attainable. The application of pressure also breaks up the surface oxides and surface asperites so as to present clean surfaces for bonding.

The elevated temperatures used for diffusion bonding serve to accelerate diffusion of atoms at the joint interfaces as well as to provide a metal softening which aids in surface deformation thereby allowing more intimate contact for atom bonding and movement across the joint interface.

With practice of this technique, it has become accepted that diffusion bonding of titanium aluminide materials must be conducted in a controlled environment in order to ensure cleanliness of the materials which are particularly sensitive to oxygen, nitrogen, and water vapor content in the air at elevated temperatures. Unless titanium aluminide is protected during this bonding process, it becomes embrittled and its integrity is destroyed.

SUMMARY OF THE INVENTION

It is therefore a primary object of the present invention to provide an improved apparatus for aiding in the process of diffusion bonding titanium aluminide materials and other similar reactive materials.

Another object of the present invention is to provide a retort or envelope for titanium aluminide materials which facilitates diffusion bonding of these materials within an isolated, controlled environment thereby enabling minimized contamination of the surfaces to be joined.

Still another object of the invention is to provide a frame member within a protective retort or envelope for enabling efficient evacuation of the retort prior to carrying out a process of gas diffusion bonding, where the retort also functions as one chamber-defining component of the diffusion bonding chamber required for effecting gas diffusion bonding.

Briefly, the invention is a metallic envelope for effecting diffusion bonding of a stack of titanium aluminide blank workpieces at preselected areas in an environment which ensures a contamination-free process, and a method of using such a device for attaining contamination-free diffusion bonding.

More particularly, protective envelope includes a first, upper sheet of metal and a second, lower sheet of metal, both sheets preferably being of stainless steel. The stack of blank workpieces is placed between the first and second sheets, and a rectangular metal frame placed adjacent the perimeter of the stack within the volume defined between the two sheets. After the sheets are sealed about their perimeters, the contained volume is evacuated by appropriate equipment. Slots in the rectangular frame facilitate evacuation of the volume defined between the two sheets and located within the frame. The frame itself prevents crushing of the edges of the stack of workpieces during creation of the contamination-free vacuum environment.

Addition of a second rectangular frame, secured atop the second sheet of metal of the protective envelope at a location outside the perimeter of the first frame, provides a construction which, together with the protective envelope, effectively forms a gas diffusion bonding tool. The tool facilitates gas diffusion bonding of the stack of workpieces by forming, along with a second tool with which it is sealingly engaged, a chamber into which a high pressure gas is directed, following a cycle of elevating the temperature of the tools, to effect the diffusion bonding process.

BRIEF DESCRIPTION OF THE DRAWINGS

Other objects and advantages of the invention will become apparent upon reading the following detailed description and upon reference to the drawings, in which.

While the invention will be described in connection with preferred procedures, it is to be understood that the following detailed description is not intended to limit the invention to those procedures. On the contrary, it is intended to cover all alternatives, modifications, and equivalents that may be included within the spirit and scope of the invention.

DETAILED DESCRIPTION OF THE INVENTION

As is well-known, diffusion bonding is a process through which separate elements can be joined to form a single unitary mass. The quality of the bond and the parameters employed necessarily vary for each particular choice of material used.

The present invention is particularly directed to reactive metals which have surfaces that would be contaminated at the elevated temperatures required for both diffusion bonding and superplastic preforming, i.e., at the temperatures of 1700° F. to about 1900° F. depending on the specific alloy used.

Figure 1:
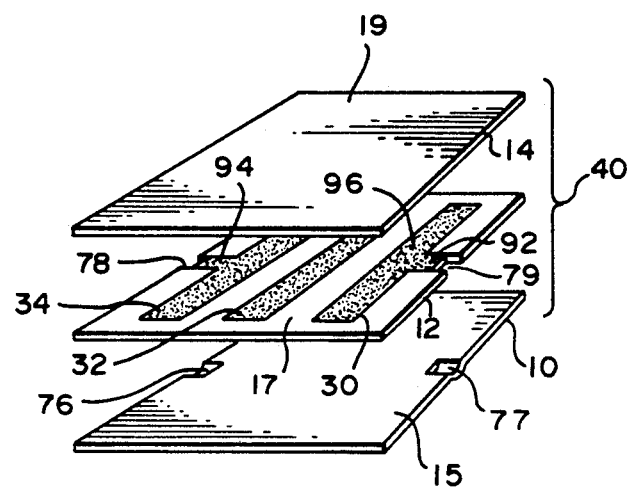
FIG. 1 is an exploded view of a three-piece metal sheet assembly treated for selective diffusion bonding prior to insertion in the protective envelope.

Referring now to FIG. 1, there is shown an exploded view of a three-piece metal sheet assembly to be formed into a sandwich structure according to the present invention. The assembly is made up of metal blanks 10, 12, 14 all preferably in the form of sheets having upper and lower opposed principal surfaces 15 and 16, 17 and 18, and 19 and 20, respectively (see also FIG. 4). The number of sheets used will vary depending on load conditions and design requirements. However, a minimum of two sheets must be used. Desirably, at least one of the sheets will exhibit superplastic properties. Any metal that exhibits suitable superplastic properties within a workable temperature range can be used for such sheet. Of greatest interest, however, are metal materials that exhibit superplastic properties within a temperature range required for diffusion bonding and that are subject to contamination at forming temperatures. Materials which typically exhibit these characteristics are titanium aluminides. It is important to note that the forming temperature for titanium aluminides is approximately 1800° F. The initial thickness of metal blanks 10, 12, 14 is determined as a function of the dimensions of the part to be formed.

In order to join only selected areas of the metal sheets, a preferred step is to apply a suitable stop-off material to those areas within the stack of sheets where no attachment or joining between the sheets is desired. Thus, as shown in FIG. 1, areas 30, 32 and 34 are covered with a stop-off material to prevent bonding in those areas. Other areas on surfaces 15, 18 and 20 could also be covered for the prevention of joining. Alternatively, the metal sheet structure could be spot welded or brazed at those areas where joining is desired. Additionally, as hereinafter explained, the metal sheet structure or stack 40 could be diffusion bonded at selected areas by selective application of pressure.

Additionally, when treating selected areas of the stack 40 with stop-off material to prevent diffusion bonding in those locations, additional areas such as are shown at 92 and 94 should also be treated to prevent bonding. Once the retort has been used to facilitate the process of diffusion bonding of the stack, and the process has been completed, further treatment of the stack may be performed with the retort removed, in particular the process of superplastic forming (SPF). To carry out this SPF process, gas inflation tubes must be inserted into the stack, typically at predetermined locations. The stop-off material applied to the additional areas 92 and 94 prevent bonding of the sheets of the stack where the tubes will be inserted. This will insure that expansion gas used in the SPF process will reach the interior of the stack through the thus preselected non-diffusion bonded areas.

Figure 2:
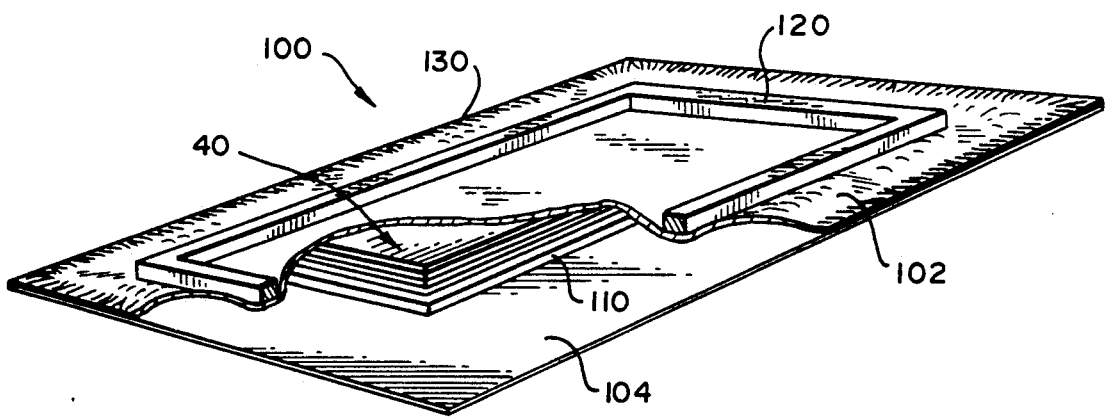
FIG. 2 is a perspective view of the retort, with a portion broken away, showing the manner of fabrication of the retort about the pack of metal sheets prior to effecting diffusion bonding.

FIG. 2 illustrates the retort 100 of the present invention in perspective view with a portion broken away to show the elements of which the retort is comprised. In particular, the retort 100 includes a first sheet 102 and a second, bottom sheet 104, the first and second sheets defining a volume therebetween. Preferably, the two sheets are fashioned from an easily formable, thermally conductive material, as for example, stainless steel. A metal sheet assembly or stack 40 consisting of a plurality of overlying metal sheets, as described above, is disposed on the upper side of the bottom sheet 104. A first frame 110 having a substantially rectangular configuration is disposed within the volume defined between the top and bottom sheets of the retort atop the bottom sheet and about the periphery of the stack. The height of the first frame is preferably greater than the height of the stack so that when the top sheet of the retort is fixed in place atop the bottom sheet, the volume defined between the top and bottom sheets encompasses the stack.

Preferably, when constructing the retort, the stack 40 is first placed atop the bottom sheet 104 in a substantially central location. Then the frame 110 is placed about the stack and may be tack-welded to the bottom sheet. The top sheet is disposed atop the bottom sheet over the stack and first frame, and the periphery of the top sheet is then secured to the periphery of the bottom sheet, as for example by welding along the periphery of the top and bottom sheets (see generally the weld 130 in FIGS. 2 and 3) so that a "volume", formed between the top and bottom sheets and within the perimeter of the first frame, is effectively sealed.

Slots 112 (see FIG. 3) in the first frame 110 are provided to facilitate the creation of a vacuum in the volume defined between the top and the bottom sheets 102, 104 of the retort. The slots are provided in the entire periphery of the first frame at a predetermined selected spacing one from the next, and extend from the inner side of the first frame (the side adjacent the stack 40) to the outer, opposite side. The slots further are disposed at right angles to the height of the first frame. A shallow groove (preferably on the order of 0.060 inches wide and 0.020 inches deep) 106 is formed on opposite sides of the first frame 110 in the bottom sheet 104. The groove extends from an inner end disposed adjacent to the outer side of the first frame to an outer end located about two thirds the distance between the first frame and the outer periphery of the bottom sheet. On each opposite side of the first frame, a short length of tubing 150, 152 is disposed on the bottom sheet for communicating the outer end of the shallow groove with the ambient beyond the outer periphery of the bottom sheet. Thus, when the top and bottom sheet are sealed to one another to form the retort, the air in the "volume" defined between the top and bottom sheets 102, 104 and within the first frame can be evacuated by appropriate equipment located outside the retort. In this manner, a contamination-free and oxygen-free environment can be maintained within the retort during the initial heat-up phase of the process in advance of actually carrying out the step of diffusion bonding.

Figure 3:
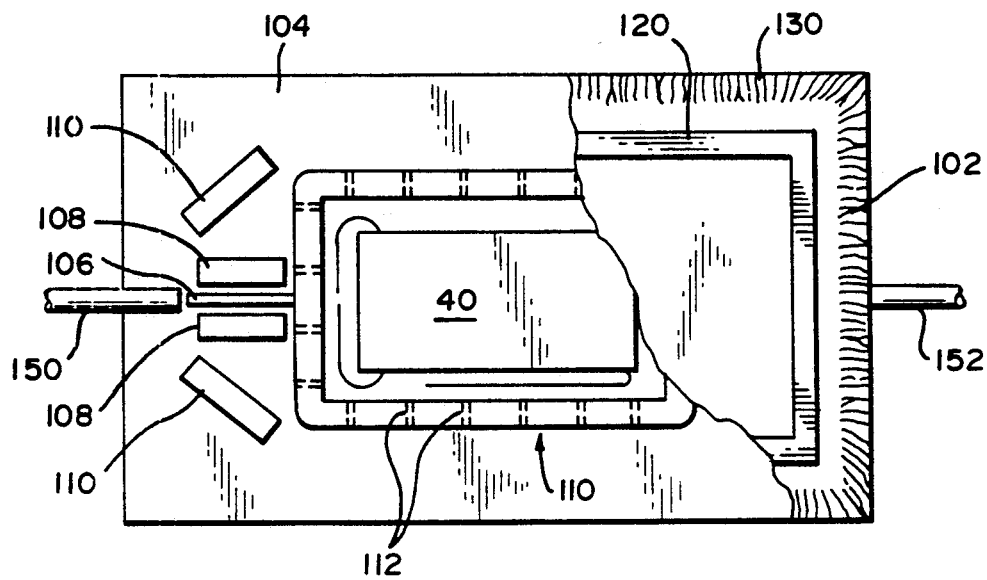
FIG. 3 is a top view, partially broken away, showing the various internal components of the retort illustrated in FIG. 2 including a frame member secured atop the retort to form a tool useful in effecting gas diffusion bonding.

Thin sheets of material 108, 108, preferably of a rectangular configuration as shown in FIG. 3, are preferably disposed adjacent each groove 106 formed in the bottom sheet. These sheets have a thickness of a magnitude which will not interfere with the sealing of the edges of the retort, but yet will provide protection against the top and bottom sheets of the retort closing off the passageway or groove 106 communicating the "volume" contained within the first frame of the retort and the ambient during the evacuation and heat-up phases of the process.

Evacuation of the "volume" within the retort may be accomplished by sealing one of the tubing members 150 or 152, connecting the other of the tubing members to a vacuum pump, and then actuating the pump to apply a negative pressure (suction) to the interior of the retort to thereby evacuate the "volume". The pump is operated until a pressure gauge P1 associated with the pump shows attainment of a predetermined vacuum level. A second pressure gauge P2 may be used to ensure that a vacuum has been attained throughout the retort. This is accomplished by coupling the gauge to the interior of the retort and using the gauge to verify that a vacuum exists throughout the entire retort.

During this process of evacuating the retort, the sheets 108, 108 protect the closing off of the groove 106. For additional support and/or protection, sheets 109, 109 of a configuration and thickness similar to that of sheets 108, 108, can be provided on opposite sides of the groove outside of the sheets 108, 108.

Retort 100 also includes a second frame 120 of substantially rectangular configuration, and of a perimetrical configuration which is congruous with, and of a size which encompasses, the first frame 110. The second frame is secured atop the top sheet 102 of the retort by an attachment mechanism similar to that used to secure the first frame to the bottom sheet. The purpose of the second frame will be described below in connection with the apparatus contemplated for achieving diffusion bonding of the enclosed stack 40 of metal sheets. The top surface of frame 120 is disposed, relative to the top surface of top sheet 102, at a height which is sufficiently great enough to extend above the uppermost surface of top sheet 102, as shown in FIG. 4.

Figure 4:
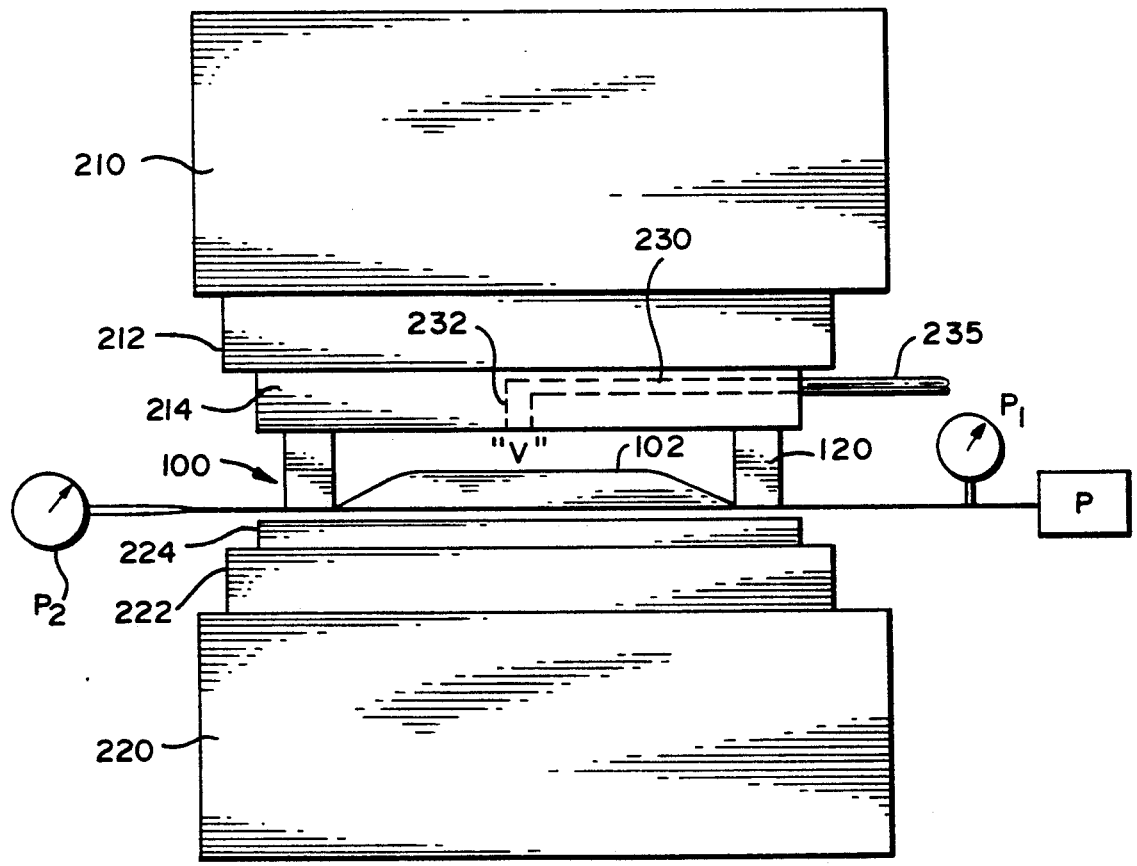
FIG. 4 is a side elevational view of a tool assembly used to effect diffusion bonding as contemplated by the present invention, with the sealed retort being disposed between upper and lower press assembly tools in advance of effecting the steps of high temperature heating and diffusion bonding.

Referring now to FIG. 4, an apparatus is shown which can be used for effecting high temperature gas diffusion bonding in the manner contemplated by the present invention. More specifically, the apparatus includes an upper press member 210 and a lower press member 220. A platen member 212 is mounted on the exposed face of the upper press member, and an upper tool 214 is mounted on the exposed face of the upper platen member. Likewise, a lower platen member 222 is mounted on the exposed face of the lower press member 220, and a lower tool 224 is mounted on the exposed face of the lower platen member. The upper and lower platens are fabricated from ceramic materials. Preferably, the upper and lower tools are made from metals which possess excellent heat transfer characteristics. A horizontally extending gas transfer passage 230 is connected with a second, vertically extending gas transfer passage 232 which extends from the central location in the upper tool to a central location in the exposed face of the upper tool. A pressure line 235 connects the gas transfer passage 230 with a source (not shown) of bonding gas under high pressure, and appropriate valve means for initiating and stopping the flow of gas to the gas transfer passage 230 for a purpose described in greater detail below.

When the retort assembly 100 is positioned in an appropriate location on the lower tool of the press assembly, the upper and lower tools are moved relative to one another so that the spacing between the two tools is decreased. As the upper tool moves downwardly toward the lower tool, the exposed face of the upper tool engages the top surface of the second frame 120. The upper tool is caused to move into engagement with the top surfaces of the frame 120 with sufficient downward pressure to create a sealed volume "V" between the upper surface of the retort top sheet 102, the inner sides of the frame 120, and the lower exposed surface of the upper tool. Throughout these maneuvers, a vacuum is being maintained within the retort via the externally connected pump.

At this point, a heated environment is created about the retort 100 while the retort continues to be secured in the press assembly 200. As the retort is heated to a temperature within the range of approximately 1700° F. to 1900° F., gas is pumped through the line 235 into the volume "V" so as to create an enormous pressure within the volume "V". This pressure drives the top sheet of the retort downwardly toward the bottom sheet of the retort. In this manner, facing surfaces of the metal sheets of the stack 40 are pressed together with a force of a magnitude sufficient to effect diffusion bonding.

During this aspect of the process, the frame 120 keeps the edges of the metal sheets of the stack 40 from being crushed by the top sheet of the retort as the latter is driven downwardly against the stack by the gas being forced into the volume "V".

After maintaining this high pressure and high heat environment for a predetermined period of time (of sufficient duration to accomplish diffusion bonding), the gas pressure is released, the temperature environment about the press assembly is cooled, the press assembly is opened and the retort is cooled to a temperature at which removal of the retort can be practically accomplished.

Thus it is apparent that there has been provided, in accordance with the invention, a retort for carrying out the method of diffusion bonding of a stack of sheet-like workpieces which fully satisfies the objectives, aims, and advantages set forth above. While the invention has been described in conjunction with specific embodiments thereof, it is evident that many alternatives, modifications, and variations will be apparent to those skilled in-the art in light of the foregoing description. Accordingly, it is intended to embrace all such alternatives, modifications, and variations which fall within the spirit and scope of the appended claims.

What I claim as my invention is:

1. A tool for interaction with one of a pair of press members to define a chamber in which gas diffusion bonding of preselected areas of a stack of sheets of titanium aluminide material can be carried out, said tool comprising:

an envelope for enclosing said stack within a sealed, evacuated environment;

a frame member disposed on one exterior surface of said envelope facing said one press member and having a perimeter which encompasses the perimeter of said stack;

said frame member having a height greater than the greatest height of said envelope atop said stack, whereby when said envelope and said press member are moved toward one another in advance of carrying out said diffusion bonding process, the volume between said press member and said envelope atop said stack form a bonding chamber into which gas can be pumped to create a diffusion bonding pressure, said chamber being heated to a diffusion bonding temperature while said pressure is maintained over a period of time sufficient to effect diffusion bonding.

2. The tool of claim 1, wherein said envelope includes means for protecting the edges of the sheets of said stack from being crushed during the process of gas pressure diffusion bonding, said protecting means being disposed about the perimeter of said stack, said frame member having a perimeter which encompasses said protecting means as well as said stack.

3. The tool of claim 2, wherein said means for protecting said stack edges includes slots extending therethrough and communicating a volume within said envelope in close proximity to one side of said protecting means adjacent said stack with a volume within said envelope in close proximity to the opposite side of said protecting means.

4. A method for preventing the deformation of various regions of sheets of titanium aluminide material which have been arranged in a stack, while simultaneously diffusion bonding other preselected regions of said sheets, said method comprising:
locating said stack of titanium aluminide material sheets between upper and lower sheets of metal to define an envelope containing said stack,
disposing a protective frame member about the exterior of said stack of sheets within said envelope, said frame member having a height which exceeds the height of said stack,
sealing said upper and lower sheets of said envelope to one another about the exterior of said frame member,
providing a contamination-free environment in said envelope, and
effecting diffusion bonding, whereby said various regions are prevented from being deformed.

5. The method of claim 12, wherein
said step of locating said stack in a sealed envelope of metal comprises providing means for communicating the interior of said envelope with the ambient, and
said step of providing a contamination-free environment in said envelope includes connecting vacuum-generating equipment to said communicating means to create a vacuum within said envelope.

6. The method of claim 5, and further maintaining said vacuum within said envelope during the entire diffusion bonding process.

7. An apparatus for providing a contamination-free environment for a reactive metal workpiece during a gas pressure diffusion bonding process, said apparatus comprising:
a metallic envelope including top and bottom sheets having facing peripheral edge regions and channel means, associated with said bottom sheet, for communicating an envelope portion located interior of said peripheral edge regions with the ambient, and
means, communicating with said channel means, for evacuating said envelope portion located interior of said peripheral edge regions in advance of and during said diffusion bonding process,
framing means disposed between said top and bottom sheets and surrounding said workpiece,
said top and bottom sheets and said framing means defining an interior volume within which the workpiece is housed,
said framing means being greater in height than said workpiece so that edge portions of said workpiece are protected against crushing during the diffusion bonding process.

8. The apparatus of claim 7, wherein said channel means includes a groove extending from a location adjacent said framing means toward said peripheral edge regions of said envelope, tubing means connecting the groove with the ambient, and protection sheet means for preventing the closing of the channel means during evacuation of said envelope portion located interior of said peripheral edge regions.

9. The apparatus of claim 7, and further comprising a second frame member located above said top sheet of said envelope, said second frame member having a perimeter which encompasses said framing means,
whereby, in carrying out said gas diffusion bonding process, said second frame member coacts with a press apparatus to create a gas diffusion bonding chamber within which pressures of diffusion bonding magnitude can be generated.

* * * * *